(12) United States Patent
Harty et al.

(10) Patent No.: US 6,552,450 B2
(45) Date of Patent: Apr. 22, 2003

(54) RECIPROCATING ENGINE

(76) Inventors: William Thomas Harty, PO Box 311, Milk River, Alberta (CA), T0K 1M0; John Thomas Harty, PO Box 790, Milk River, Alberta (CA), T0K 1M0

( * ) Notice: Subject to any disclaimer, the term of this patent is extended or adjusted under 35 U.S.C. 154(b) by 0 days.

(21) Appl. No.: 09/878,228

(22) Filed: Jun. 12, 2001

(65) Prior Publication Data

US 2002/0185920 A1 Dec. 12, 2002

(51) Int. Cl.$^7$ .................... H02K 33/00; H02K 7/06
(52) U.S. Cl. .................... 310/16; 310/16; 310/20; 310/12; 310/15
(58) Field of Search .................... 310/16, 24, 12, 310/13

(56) References Cited

U.S. PATENT DOCUMENTS 3,967,146 A * 6/1976 Howard .................... 310/80
4,507,579 A * 3/1985 Turner .................... 310/23
5,457,349 A * 10/1995 Gifford .................... 310/24

* cited by examiner

Primary Examiner—Nestor Ramirez
Assistant Examiner—Iraj A Mohandesi
(74) Attorney, Agent, or Firm—I. Zborovsky

(57) ABSTRACT

A reciprocating engine has at least one cylinder forming an inner chamber, at least one piston reciprocatingly movable in the inner chamber of the at least one cylinder, a unit for converting a reciprocating movement of the piston to move an outside object, a unit for reciprocatingly moving the at least one piston in the at least one cylinder the reciprocatingly moving unit including magnet elements with at least one electromagnet connected with the cylinder and at least another electromagnet connected with the piston, so that when a polarity of the magnet elements is changed, a magnetic interaction of the electromagnets with one another causes the reciprocating movement of the piston.

10 Claims, 3 Drawing Sheets

RECIPROCATING ENGINE

BACKGROUND OF THE INVENTION

The present invention relates to reciprocating engines.

More particularly it relates to reciprocating engines in which a reciprocating movement of the piston is performed under the action of a magnet cooperation between magnet means of the cylinder and the piston.

Reciprocating engines of the above mentioned general type are known in the art. In the known reciprocating engines an electromagnet and a permanent magnet are utilized. By using the permanent magnet and the electromagnet, the maximum power is only achieved when they are matched in strength. When an electromagnet becomes weaker or stronger than the permanent magnet, the attraction and repulsion are not as efficient. Some of the solutions in the reciprocating engines are disclosed for example in U.S. Pat. Nos. 1,436,425; 3,105,162; 4,523,114; 5,036,930; 5,219,034; 4,317,058; 5,592,036; and the European patent document EP 0596717. It is believed that the existing reciprocating engines of this type can be further improved.

SUMMARY OF THE INVENTION

Accordingly, it is an object of the present invention to provide a reciprocating engine which is a further improvement of the existing engines.

In keeping with these objects and with others which will become apparent hereinafter, one feature of the present invention resides, briefly stated, in a reciprocating engine which has at least one cylinder forming an inner chamber; at least one piston reciprocatingly movable in said inner chamber of said at least one cylinder; means for converting a reciprocating movement of said piston to move an outside object; means for reciprocatingly moving said at least one piston in said at least one cylinder, said reciprocatingly moving means including electromagnet means with at least one electromagnet connected with said cylinder and at least another electromagnet connected with said piston, so that when a polarity of said magnet means is changed, a magnetic interaction of said electromagnets with one another causes said reciprocating movement of said piston.

When the reciprocating engine is designed in accordance with the present invention the electromagnets of the cylinder and the piston are evenly matched in polarity and strength to apply a reciprocating force by reversing polarities to successively attract and repel the piston in the cylinder, which piston is connected to a crankshaft to produce a rotary power.

In accordance with one embodiment of the invention, the piston and the cylinder each have one electromagnet and the polarities are switched so that the electromagnet of the cylinder repels and then attracts the electromagnet of the piston.

In accordance with another embodiment of the present invention the cylinder has two electromagnets located at opposite ends and the piston has also two electromagnets located at opposite sides, so that one electromagnet of the cylinder repels one electromagnet of the piston while the other electromagnet of the cylinder attracts the other electromagnet of the piston and vice versa.

In accordance with still a further embodiment of the present invention the cylinder can have two electromagnets which are located opposite to one another, while the piston has only one electromagnet. The reciprocating movement of the piston is achieved by repelling the electromagnet of the piston with one electromagnet of the cylinder and attracting the electromagnet of the piston with the other electromagnet of the cylinder, and vice versa.

In accordance with still a further feature of the present invention each cylinder can have two pistons with two electromagnets, connected with one another for joint reciprocating movement.

In accordance with still a further feature of the present invention two cylinders can be provided with electromagnets, and two pistons provided with electromagnets can be connected with one another so that they jointly reciprocate in the two cylinders. Therefore if the magnetic system of one of the cylinders fails, the magnetic system of the other cylinder causes reciprocation of both pistons in both cylinders.

In accordance with still a further feature of the present invention, air which is displaced under the piston moving in a predetermined direction is relieved to flow outside and to be used for various purposes, for example for cooling of the engine.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
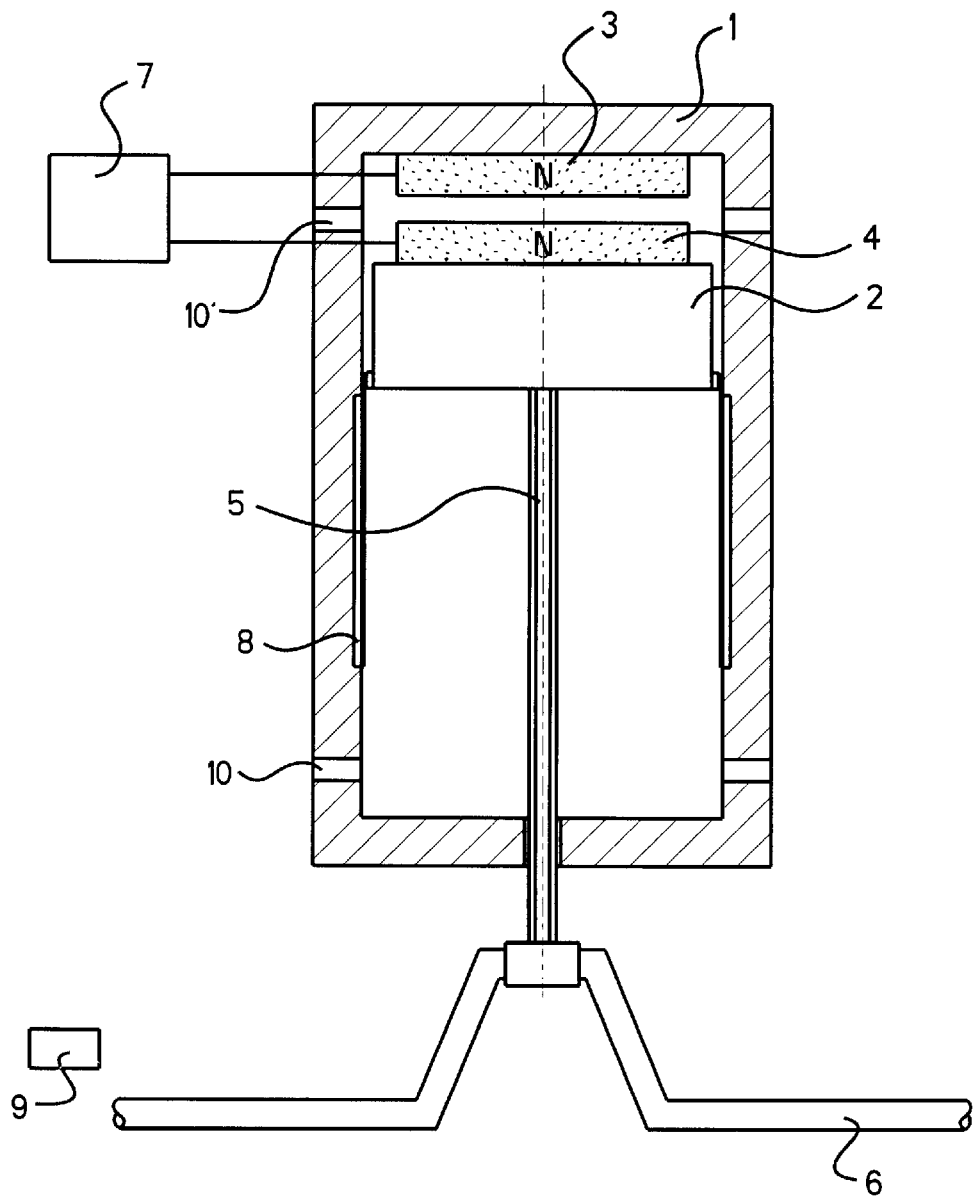
FIG. 1 is a view showing a reciprocating engine in accordance with one embodiment of the present invention.

A reciprocating engine in accordance with the present invention has at least one cylinder is identified as a whole with reference numeral 1 and limits an inner chamber. The reciprocating engine further has a piston which is identified with reference numeral 2 and reciprocates in the inner chamber of the cylinder 1. For this purpose electromagnet means are provided in the inventive reciprocating engine. The electromagnet means include an electromagnet 3 which is immovably connected with the cylinder, for example with an upper wall of the cylinder, and an electromagnet 4 which is immovably connected with the piston, 2 for example with the upper surface of the piston. The piston 2 is connected with means for converting its reciprocating movement into a rotary movement. Such converting means can include a connecting rod 5 and a crankshaft 6. Means 7 are further provided for switching a polarity of the electromagnets of the inventive reciprocating engine, which can be formed as known control means.

The reciprocating engine in accordance with the present invention operates in the following manner:

In the initial position shown in FIG. 1 the piston 2 is located in its upper position which is close to the upper wall of the cylinder 1, and the electromagnet 3 and 4 have opposite polarities so that the electromagnet 4 of the piston 2 is attracted to the electromagnet 3 of the cylinder 1. Then the polarity switching means 7 change the polarity of at least one of the electromagnets, for example of the electromagnet 4 of the piston 2, so that the electromagnets 3 and 4 of the cylinder 1 and the piston 2 now have the same polarities. As a result the electromagnet 4 of the piston 2 will be repelled from the electromagnet 3 of the cylinder 1 and the piston 2 will move downwardly in FIG. 1. At the end of the stroke of the piston 2 downwardly, the polarity of the electromagnet 4 is changed again so that now the electromagnets 3 and 4 have different polarities. As a result the electromagnet 4 of the piston 2 is attracted to the electromagnet 3 of the cylinder 1 and the piston 2 is moved upwardly. This cycle repeats many times so as to provide a continuous reciprocating movement of the piston 2 in the cylinder 1, which is converted through the connecting rods 5 and the crankshaft 6 into a rotary movement.

Figure 2:
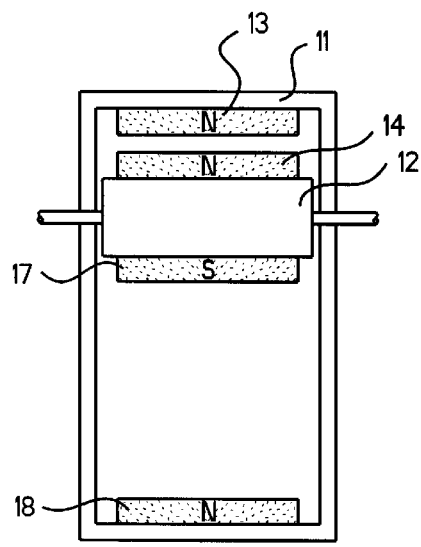
FIG. 2 is a view showing the inventive reciprocating engine in accordance with another embodiment of the present invention.

The reciprocating engine in accordance with a second embodiment is shown in FIG. 2. The parts of this engine which are similar to the parts of the engine shown in FIG. 1 are identified with reference numerals which are increased by 10. In addition to the electromagnet 13 provided on the one end of the cylinder 11 and the electromagnet 14 provided on the one side of the piston 12, the reciprocating engine has another electromagnet 17 provided on the opposite side of the piston 12 and another electromagnet 18 provided on the opposite end of the cylinder 11. Thus, the reciprocating engine of the embodiment shown in FIG. 2 has two pairs of the electromagnets. The reciprocating engine shown in FIG. 2 operates in the following manner. The polarities of the electromagnets are controlled so that when the electromagnet 13 of the cylinder 11 attracts the electromagnet 14 of the piston 12, the electromagnet 18 at the opposite end of the cylinder 11 repels the electromagnet 17 at the opposite side of the piston 12. Thereafter the polarities are reversed. Therefore the piston 12 is subjected to the repelling-attracting forces from both sides of the piston.

Figure 3:
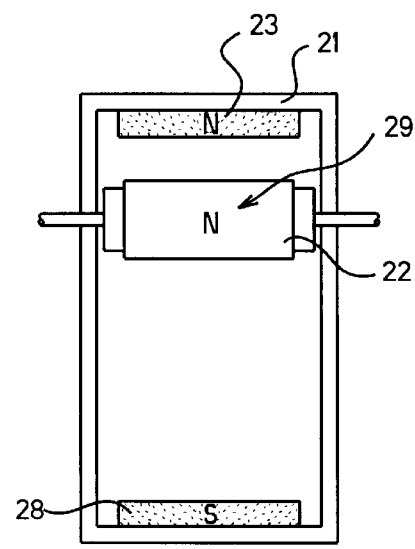
FIG. 3 is a view showing the inventive reciprocating engine in accordance with still another embodiment of the present invention.

Another embodiment of the reciprocating engine in accordance with the present invention is shown in FIG. 3. Here the piston 22 has only one electromagnet 29 while the cylinder 21 has two electromagnets 23 and 28 arranged at opposite ends of the cylinder. The polarities of the electromagnets are controlled so that the electromagnets 23 and 28 always have opposite polarities, and the electromagnet 29 of the piston 22 has a certain polarity. For example, the electromagnet 23 has the same polarity with the electromagnet 29 so as to repel the electromagnet 29 of the piston 22, while the electromagnet 28 has an opposite polarity so as to attract the electromagnet 29 of the piston 22 and the piston moves downwardly in FIG. 3. Then the polarities are correspondingly switched, and the electromagnet 29 of the piston 22 is repelled from the electromagnet 28 and is attracted to the electromagnet 23 of the cylinder 21 to move upwardly.

It is to be understood that switching of the polarities can be performed in different ways. In particular, it is possible to switch the polarity of the electromagnet (electromagnets) exclusively on the cylinder, or to switch the electromagnet (electromagnets) exclusively on the piston, or both.

Figure 4A:
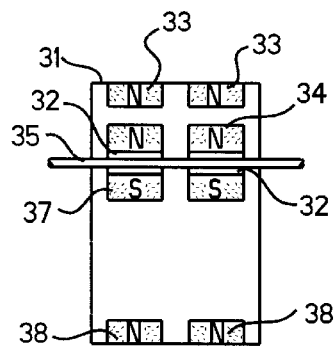
FIGS. 4a–4d are views showing the reciprocating engine in accordance with a further embodiment of the present invention in four different positions.
Figure 4B:
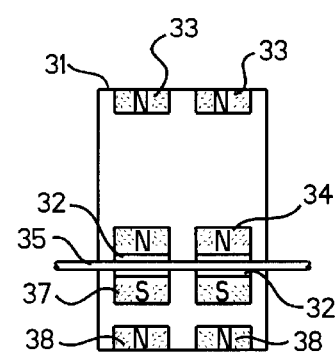
Figure 4C:
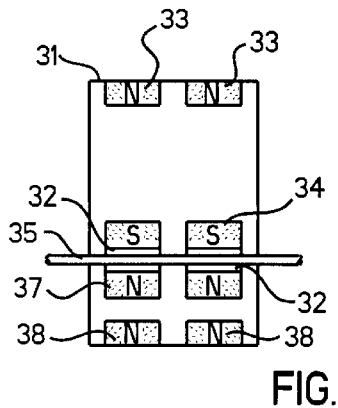
Figure 4D:
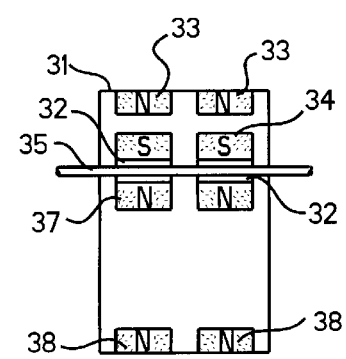

FIGS. 4a–4d show another modification of the inventive reciprocating engine in which two pistons 32 move in one cylinder 31 and are connected with one another by a connecting rod or pin 35. Each piston, as in the embodiment of FIG. 2 has two electromagnets 34 and 37 provided on its opposite sides, and the cylinder has electromagnets 33 and 38 provided on its opposite ends. By switching of the corresponding polarities, the electromagnets of both pistons are simultaneously repelled from the electromagnets at one end of the cylinder and are attracted by the electromagnets at the other end of the cylinder to perform a stroke in one direction, and thereafter the polarity is switched so as to perform the stroke in the opposite direction. In FIG. 4a the electromagnets 34 of the pistons 32 are close to the electromagnets 33 at the upper end of the cylinder 31 before switching a polarity, and then when the polarity is switched the pistons move downwardly. In the position shown in FIG. 4b the electromagnets 37 of the pistons 32 are attracted to the electromagnets 38 at the lower end of the cylinder. In the position shown in FIG. 4c the polarity is switched so that the electromagnets 37 of the pistons 32 are repelled from the electromagnets 38 at the lower end of the cylinder 31. In the position shown in FIG. 4d the electromagnet 34 again reach the position in which they are close to the electromagnets 33 of the upper end of the cylinder 31. In this embodiment the connecting rod or pin 35 is connected to the crankshaft.

Figures 5, 6:
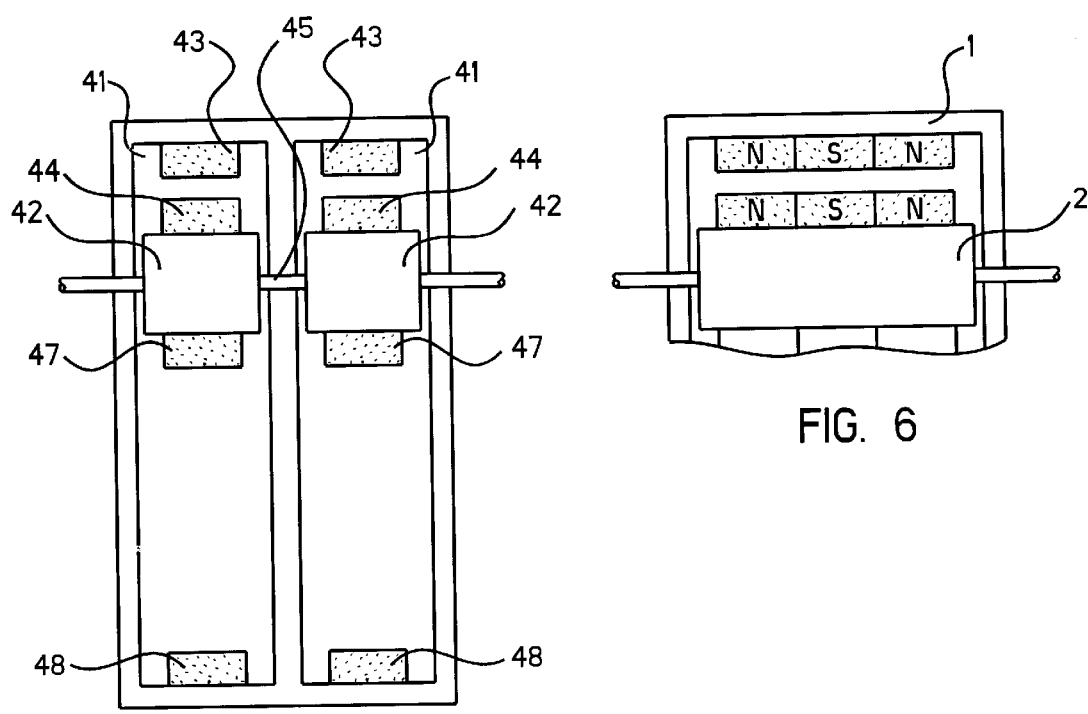
FIG. 5 is a view showing the inventive reciprocating engine in accordance with an additional embodiment of the present invention.
FIG. 6 shows a further modification of the inventive reciprocating engine.

The reciprocating engine in accordance with the embodiment shown in FIG. 5 has two cylinders which are identified with reference numerals 41 and two pistons 42 reciprocating in the corresponding cylinders 41. The pistons 42 are connected with one another by a connecting rod or pin 45. The operation of the reciprocating engine shown in FIG. 5 is substantially similar to the operation of the reciprocating piston shown in FIGS. 4a–4d. Both pistons 42 have electromagnets 44, 47 at their opposite sides, and both cylinders 41 have electromagnets 43, 48 at their opposite ends. The electromagnets at one end of the both cylinders 41 repel the electromagnets of both pistons 42, while the electromagnets at the opposite end of the cylinders 41 attract the electromagnets of the pistons 42, and thereafter the polarity is switched, to provide a continuous reciprocating movement of the pistons 42 in two cylinders. This construction has the advantage that if the electromagnet means in one cylinder failed, both pistons still will perform the reciprocating movement as long as the electromagnet means in the other cylinder operate in a normal manner.

The polarity switching means can operate in response to sensing a position of the piston, related elements for example a position of the crankshaft. For this purpose a sensor 9 can be associated with the crankshaft 6 as shown in FIG. 1. It senses a position of the crankshaft 6 and sends the signal to the polarity switching means 7, so as to switch the polarity. It is to be understood that sensing means can be associated with other movable parts of the piston-connecting rod-crankshaft assembly.

In accordance with the present invention, means 10, 10' can be provided for releasing air displaced by the piston during a corresponding stroke. This air releasing means can be formed as corresponding openings. When the piston moves in a certain direction, air in front of the piston is displaced and expelled through the respective opening. This air can be used for cooling corresponding parts of the engine.

Means can be provided for controlling the power and timing of the electromagnets, and the output power, so that the output power of the engine can be controlled with great precision. The timing can be controlled either mechanically or by a computerized timing device.

In the inventive reciprocating engine, a gap can be left at the end of a stroke of the piston so that no damage can occur to the electromagnets by their contact with one another. The gaps should be adjustable for the purpose of maximizing the power.

The electromagnets mounted on the pistons can be energized for example by contact strips embedded in the cylinder wall, transferring power through a brush to the electromagnets, as shown schematically in FIG. 1 and identified with reference numeral 8.

It is to be understood that electromagnets can be formed in many different ways. For example as shown in FIG. 6, each electromagnet can have several pole regions, such as N,S,N . . . etc.

It will be understood that each of the elements described above, or two or more together, may also find a useful application in other types of constructions differing from the types described above.

While the invention has been illustrated and described as embodied in reciprocating engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. Patent is set forth in the appended claims.

What is claimed as new and desired to be protected by Letters Patent is set forth in the appended claims:

1. A reciprocating engine, comprising at least one cylinder forming an inner chamber; at least one piston reciprocatingly movable in said inner chamber of said at least one cylinder; means for converting a reciprocating movement of said at least one piston to move an outside object; means for reciprocatingly moving said at least one piston in said at least one cylinder, said reciprocatingly moving means including magnet means with at least one electromagnet connected with said cylinder and at least another electromagnet connected with said piston, so that when a polarity of said magnet means is changed, a magnetic interaction of said electromagnets with one another causes said reciprocating movement of said piston; and means for allowing air to move out of said cylinder when air is displaced by said reciprocating movement of said piston in front of said piston and to move air into said at least one cylinder behind said piston.

2. A reciprocating engine as defined in claim 1; and further comprising means for changing a polarity of said magnet means so that said electromagnets initially have same polarities and therefore said electromagnet connected with said piston is repelled from said electromagnet connected with said cylinder and move said piston away from a corresponding portion of said cylinder, while when a polarity is changed said electromagnet of said cylinder attracts said eletromagnet of said piston and therefore said piston moves toward said portion of said cylinder.

3. A reciprocating engine as defined in claim 1, wherein said magnet means include two further electromagnets with one further electromagnet connected to said cylinder and another of said further electromagnets connected to said piston, said electromagnets of said cylinder being mounted at opposite ends of said cylinder, while said electromagnets of said piston being mounted at opposite sides of said piston, said switching means being formed so that when one of said electromagnets connected with said cylinder attract one of said electromagnets connected with said piston the other of said electromagnets connected with said cylinder repel the other of said electromagnets connected with said piston.

4. A reciprocating engine as defined in claim 1, wherein said magnet means further have another electromagnet connected with said cylinder, said electromagnets connected with said cylinder being mounted at opposite ends of said cylinder, said means for switching polarity being operative so that one of said electromagnet of said cylinder repel said electromagnet of said piston, while the other electromagnet of said cylinder attracts said electromagnet of said piston, and when the polarity is switched the other electromagnet of said cylinder repels said electromagnet of said piston and the one electromagnet of said cylinder attracts said electromagnet of said piston.

5. A reciprocating engine as defined in claim 1; and further comprising another piston reciprocatingly movable in said at least one cylinder and provided with an electromagnet; and means for connecting said pistons with one another, so that said electromagnet of said cylinder simultaneously magnetically interacts with both said electromagnets of said both pistons.

6. A reciprocating engine as defined in claim 1; and further comprising another cylinder provided with another electromagnet and another piston movable in said another cylinder and provided with another electromagnet, said pistons of said cylinders being connected with one another for joint reciprocating movement, so that if said magnet means in one of said cylinders fail, said magnet means in the other of said cylinders operate and provide reciprocating movement of both said pistons in both said cylinders.

7. A reciprocating engine as defined in claim 1, wherein said allowing means is formed so as to supply the air moved out of said cylinder for cooling of the reciprocating engine.

8. A reciprocating engine as defined in claim 1, wherein said polarity switching means include sensor means sensing a position of said at least one piston, and control means operative in response to a signal produced by said sensor and changing a polarity of said magnet means.

9. A reciprocating engine as defined in claim 8; and further comprising a crankshaft connected with said at least one piston, said sensing means being formed as a sensor which senses a position of said crankshaft.

10. A reciprocating engine as defined in claim 1, wherein said switching means is formed so that during a movement of said at least one piston in one direction a gap remains between said electromagnet of said piston and said electromagnet of said cylinder preventing a direct contact of said electromagnets of said piston and said cylinder.

* * * * *